United States Patent [19]

Christenson

[11] Patent Number: 5,665,973

[45] Date of Patent: Sep. 9, 1997

[54] PENETRANT TRANSPARENT COMPARATOR

[75] Inventor: Terry L. Christenson, Roanoke, Tex.

[73] Assignee: Lockheed Corporation, Fort Worth, Tex.

[21] Appl. No.: 548,229

[22] Filed: Oct. 25, 1995

[51] Int. Cl.$^6$ .............................. G01B 1/00; G01B 5/02; G01B 5/26

[52] U.S. Cl. .................................. 250/484.2; 250/484.4; 33/501.05; 33/501.45

[58] Field of Search .......................... 250/302, 483.1, 250/483.2, 484.4, 486.1; 33/501.05, 501.08, 501.4, 501.45, 501.5, 501.09

[56] References Cited

U.S. PATENT DOCUMENTS

| | | | |
|---|---|---|---|
| 2,767,478 | 10/1956 | Adams | 33/501.05 |
| 3,950,642 | 4/1976 | Feld | 250/302 |
| 5,471,757 | 12/1995 | McDonald | 33/501.45 |

FOREIGN PATENT DOCUMENTS

| | | | |
|---|---|---|---|
| 61-54401 | 3/1986 | Japan | 33/501.05 |
| 1-74401 | 3/1989 | Japan | 33/501.05 |

*Primary Examiner*—Edward J. Glick
*Attorney, Agent, or Firm*—Arthur F. Zobal

[57] ABSTRACT

A plurality of transparent members are provided each of which has an elongated flat portion with a tip portion at one end forming an obtuse angle relative to the elongated flat portion with the tip portion having a narrowed end, and a spot of material located on the tip portion that fluoresces in the presence of blacklight. The spots of the plurality of transparent members are of different sizes respectively. Also provided is a flat transparent member having a series of spaced apart lines of different lengths with dimension numbers formed next to the lines respectively. The lines and numbers fluoresce in the presence of blacklight. The plurality of transparent members and the flat transparent member are coupled together for movement relative to each other.

14 Claims, 2 Drawing Sheets

PENETRANT TRANSPARENT COMPARATOR

The U.S. Government has a paid-up license in this invention and the right in limited circumstances to require the patent owner to license others on reasonable terms as provided for by the terms of contract Nos. F33657-88-C0037 and F33657-82-C-2120 awarded by the U.S. Air Force.

SPECIFICATION

BACKGROUND OF THE INVENTION

1. Field of the Invention

The invention relates to a comparator for determining the relative size of flaws or cracks in a structural member based on a liquid penetrant placed in the flaws.

2. Description of the Prior Art

In the inspection of structural parts such as aircraft parts a fluorescent liquid penetrant is painted on the surface to allow the penetrant to seep in any flaws or cracks. The penetrant is washed off the surface with hot water; the surface dried; and the structure is placed under black light to allow any penetrant in discontinuities to fluoresce for location of the discontinuities. Comparators have been used to determine the size of discontinuities and spacing between adjacent discontinuities and to determine if the discontinuities are round (porosity) or linear (cracks). One known comparator is a flat transparent member having spots of material of different sizes that fluoresce in the presence of blacklight. The prior device however is hard to use and does not provide the quality measurements desired to determine if the part should be reworked to remove the discontinuities or the part rejected. In this respect, the spots of the prior art device are only an approximation of actual size.

A comparator is desired in order to allow quick quality measurements to be made of the size of the discontinuities in the surface, the distance between adjacent discontinuities and whether the discontinuities are round (porosity) or linear (cracks) and the dimensions thereof.

SUMMARY OF THE INVENTION

The comparator of the invention comprises a plurality of transparent members each having an elongated flat portion and a tip portion forming an obtuse angle relative to the elongated flat portion. The tip portion has a narrowed end. A spot of material that fluoresces in the presence of blacklight is provided on each of the tip portions. The spots provide accurate measurements to aid in determining the size of discontinuities.

A second type of elongated transparent member is provided which has a series of spaced apart lines with dimension numbers located next to the lines respectively. The lines and numbers are formed of a material that fluoresces in the presence of blacklight. The lines have different lengths and provide accurate measurements to aid in determining the lengths of the discontinuities.

DESCRIPTION OF THE PREFERRED EMBODIMENT

Figure 1:
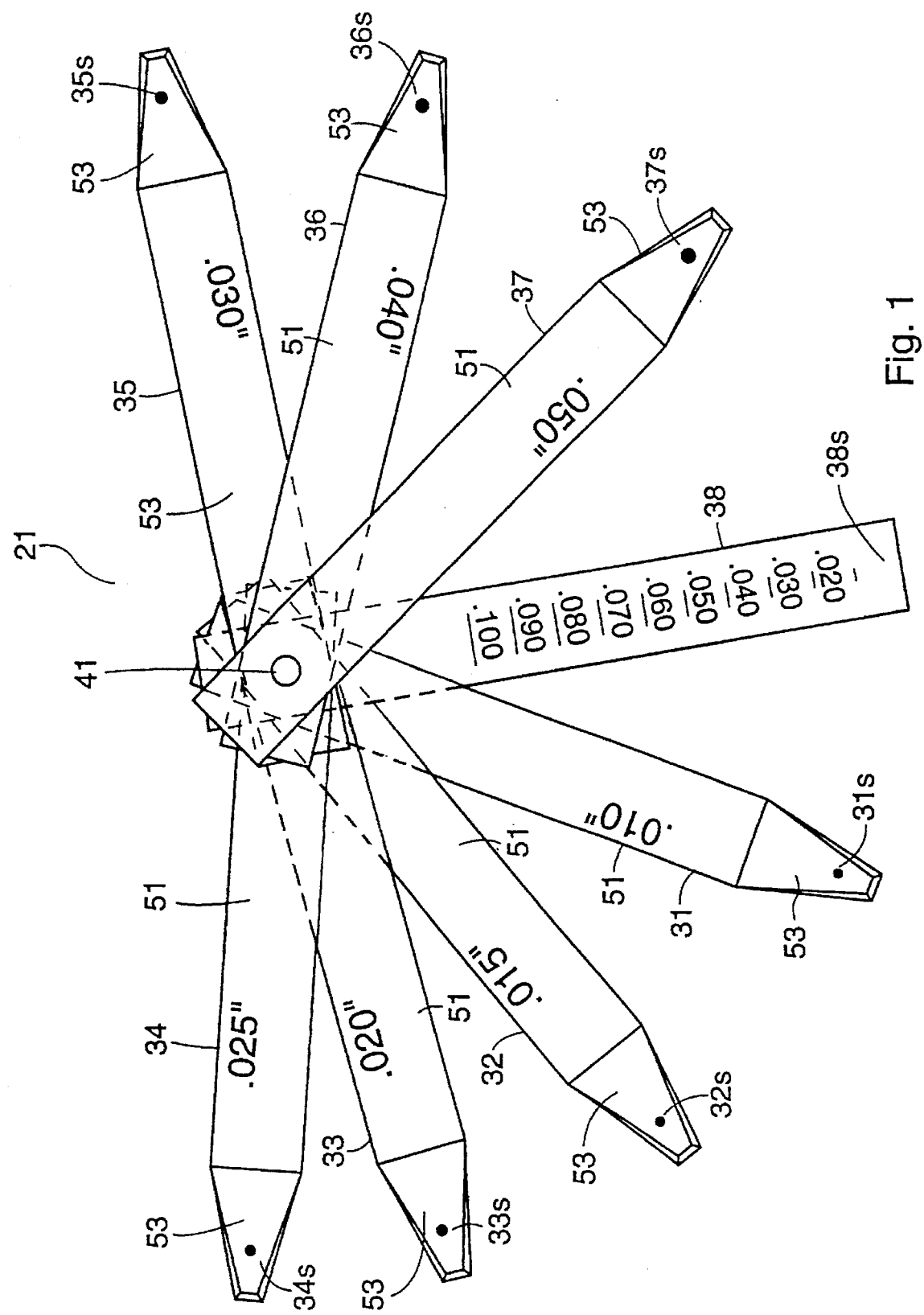
FIG. 1 is a plan view of the comparator of the invention.

Referring now to the drawings, the comparator of the invention is identified by reference numeral 21. It comprises eight arms or blades 31, 32, 33, 34, 35, 36, 37, and 38 having ends rotatably secured together by a bolt 41. Arms 35–37 are identical except for the size of the spots 31S–37S and the labeling. Each of the members 31–37 is formed of a transparent plastic material and comprises elongated flat body portion 51 having a tip portion 53 at one end 51E1 that forms an angle theta of about 120 degrees relative to the body portion 51. In FIG. 1, the tip portions are shown facing upward. The tip portion 53 has a narrowed end 53E such that its sides form a V from the end 53E to the sides 51S1 and 51S2 of the body 51. The opposite end 51E2 has an aperture 55 formed therethrough for receiving the bolt 41. Formed on the tip portion 53 is a round spot of material that fluoresces in blacklight. The spots for members 31–37 are identified by reference numerals 31S–37S. The diameters of the round spots 31S–37S of the members 31–37 are 0.010", 0.015', 0.020", 0.025", 0.030", 0.040", and 0.050", respectively. Labeling is formed on the body portions of the members 31–37. The labeling is formed of a material that fluoresces in blacklight. The labeling and numbers on the body portion 51 of the members 31–37 are as follows:

31  0.010"  "rounded indication"
32  0.015"  "rounded indication"
33  0.020"  "rounded indication" Zone 0 and Zone 1
34  0.025"  "rounded indication"
35  0.030"  "rounded indication" Zone 2 (castings)
36  0.40"  "rounded indication"
37  0.50"  "rounded indication" Zone 2 (castings)

Figure 3:
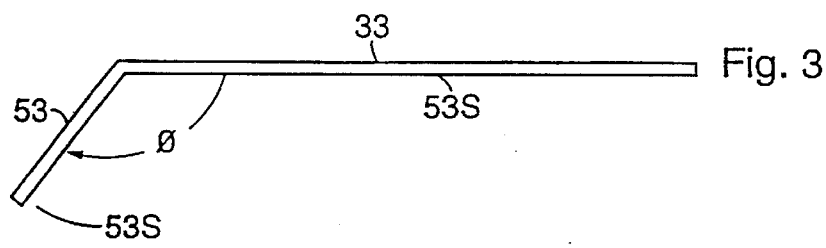
FIG. 3 is a side view of the member of FIG. 2.
Figure 4:
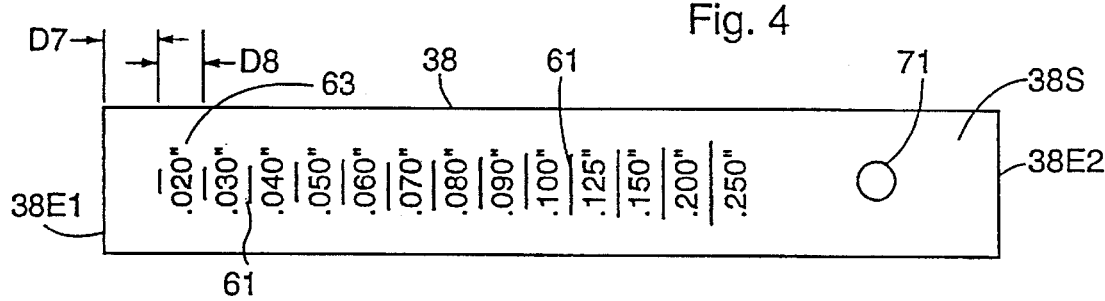
FIG. 4 is an enlarged plan view of a member of the comparator of FIG. 1 that has spaced apart dimensional lines with dimension numbers next to the lines.

The spots 31S–37S, numbers and labeling are formed on the sides 53S as shown in FIGS. 3 and which face upward in the drawing of FIG. 1.

Figure 2:
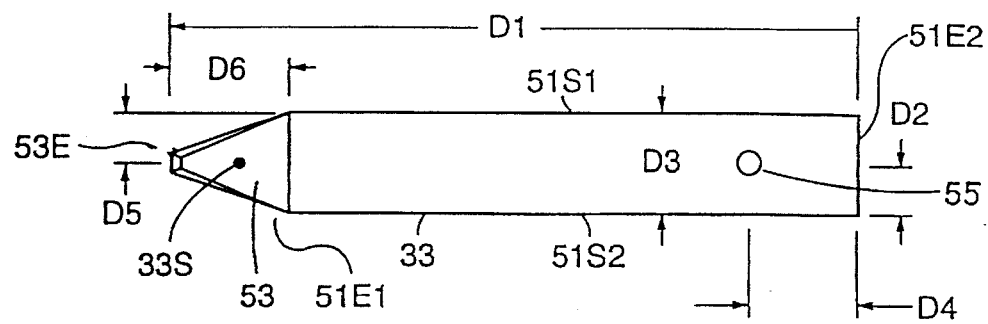
FIG. 2 is a plan view of one of the members of the comparator of FIG. 1 that has an angled tip.

In FIGS. 1 and 2 only the numbers 0.010", 0.015", 0.020", 0.025", 0.030", 0.040", and 0.050", are shown due to lack of space. These numbers give the diameters of the spots 31S–37S respectively. The spots 31S–37S and labeling are green in color and fluoresce green in blacklight. The dimensions of each of the members 31–37 is the same. The dimensions D1, D2, D3, D4, D5, and D6 are 4.0", 0.250", 0.5", 0.5", 0.250", and 0.750". The thickness of each of the members 31–37 is 0.065". The diameter of each of the apertures 55 is 0.125".

Figure 5:
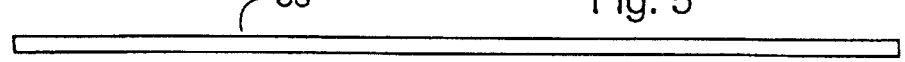
FIG. 5 is a side view of the member of FIG. 4.
Figure 6:
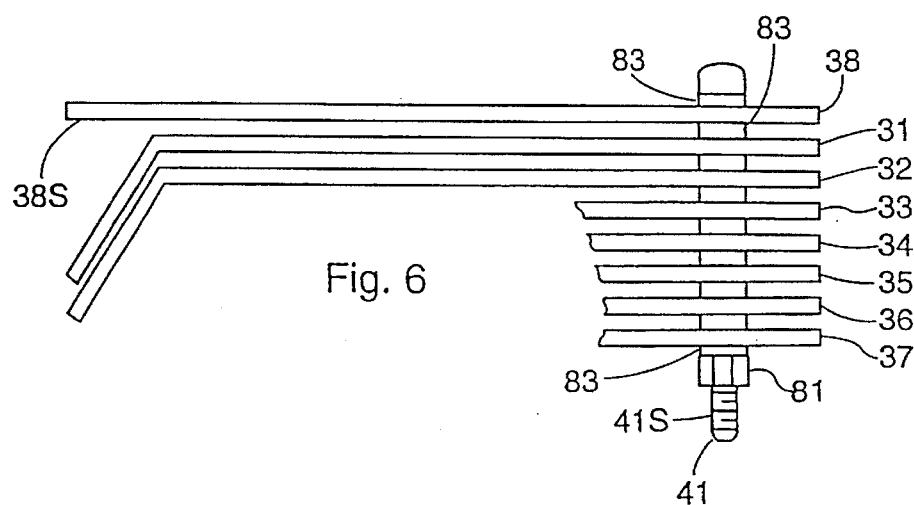
FIG. 6 is a side view of a portion of the comparator of FIG. 1.

The member 38 is a flat rectangular member formed of transparent plastic material having spaced apart lines 61 formed thereon with dimension numbers 63 formed between adjacent lines 61. The lines 61 increase in length from end 38E1 toward end 38E2. The lines 61 and numbers 63 are formed of a material that is orange in color and fluoresce orange in the presence of blacklight. The lengths of the lines 61 are equal to the dimensions shown to the immediate right of each line 61 in FIG. 5. The lines 61 and numbers 63 are formed on the side 38S as shown in FIG. 6 and which faces upward in the drawing of FIG. 1. In FIG. 1, all of the lines 61 and numbers 63 are not shown due to the lack of space. The width, length and thickness of member 38 are 0.5", 4.0", and 0.065" respectively. The dimension D7 is 0.250" and the distance D8 between adjacent lines is 61 is about 0.150". An aperture 71 is formed in the end 38E2 for receiving the bolt 41. It has a diameter of 0.125".

As shown in FIG. 6, the members 31–38 are pivotally coupled together by the bolt 41, the threaded shaft 41S of which extends through the apertures 55 and 57 and which is held in place by a nut 81. The bolt head is shown at 41H. Members 83 are washers which are used as spacers between the members 31–38. With this arrangement, the members 31–38 can be spread apart as shown in FIG. 1, or moved together in alignment when not in use as shown in FIG. 6.

The spots, numbers and labeling of the members 31–38 are traceable to the National Institute Standards Technology.

In using the apparatus, a fluorescent liquid penetrant is painted on the surface of the part to be inspected, washed off of the surface and the part placed in blacklight. The fluorescing discontinuities are compared with the spots 31S–37S to determine the size which is read off of the labeling of and numbers the members 31–37. The spots 31S–37S also aid in determining if the discontinuities are round (porosity) or linear (cracks). Due to the angled and pointed tips 53, the members 31–37 can be easily used to make comparisons particularly in hard to get at surfaces such as transverse joints between two surfaces. The member 38 can be used to determine the lengths of linear discontinuities and to determine the distance between adjacent discontinuities.

The fluorescent material used for the spots 31S–37S and for the labeling on members 31–37 and for the lines and numbers on member 38 is commercially available material. The blacklight to be used with the invention has a wavelength range of 320–400 nanometers. The preferred wavelength used is about 365 nanometers.

I claim:

1. A penetrant comparator, comprising:
a transparent member comprising an elongated portion and a tip portion forming an obtuse angle relative to said elongated portion,
said tip portion having a narrowed end, and
a spot of material on said tip portion that fluoresces in the presence of blacklight.

2. The penetrant comparator of claim 1, wherein:
said elongated portion of said transparent member has a spot size dimension number formed thereon of material that fluoresces in the presences of blacklight,
the size of said spot of material is substantially equal to the dimension represented by said spot size dimension number.

3. The penetrant comparator of claim 1, wherein:
said spot of material on said tip portion is the only spot of material on said tip portion that fluoresces in the presence of blacklight.

4. A penetrant comparator, comprising:
a first transparent member comprising an elongated portion and a tip portion forming an obtuse angle relative to said elongated portion,
said tip portion having a narrowed end,
a spot of material on said tip portion that fluoresces in the presence of blacklight,
a second transparent member having a series of spaced apart lines of different lengths with dimension numbers formed next to said lines respectively,
said lines and dimension numbers being formed of a material that fluoresces in the presence of blacklight.

5. The penetrant comparator of claim 4, wherein:
said material of said spot and said material of said lines and dimension numbers fluoresce different colors in the presence of blacklight.

6. The penetrant comparator of claim 4, wherein:
the lengths of said lines on said second transparent member are substantially equal to the dimensions represented by said dimension numbers respectively,
said elongated portion of said first transparent member has a spot size dimension number formed thereon of material that fluoresces in the presences of blacklight,
the size of said spot of material is substantially equal to the dimension represented by said spot size dimension number.

7. The penetrant comparator of claim 6, wherein:
said spot of material fluoresce in a color in the presence of blacklight that is different than the color in which said dimension numbers and said lines of said second transparent member fluoresce in the presence of blacklight.

8. A penetrant comparator, comprising:
a plurality of transparent members each of which comprises an elongated flat portion with a tip portion at one end forming an obtuse angle relative to said elongated flat portion with said tip portion having a narrowed end, and a spot of material located on each of said tip portions that fluoresces in the presence of blacklight,
said spots of said plurality of transparent members being of different sizes respectively,
each of said transparent members having a connecting end opposite its said one end, and
means for coupling said connecting ends of said plurality of transparent members together to allow said transparent members to move relative to each other.

9. The penetrant comparator of claim 8, wherein:
each of said flat portions of each of said transparent members has a different spot size dimension number formed thereon of material that fluoresce in the presence of blacklight,
the size of said spot of material on each of said transparent members is substantially equal to the dimension represented by its said spot size dimension number.

10. The penetrant comparator of claim 8, wherein:
said spot of material located on each of said tip portions is the only spot of material located on each of said tip portions that fluoresces in the presence of blacklight.

11. A penetrant comparator, comprising:
a plurality of transparent members each of which comprises an elongated flat portion with a tip portion at one end forming an obtuse angle relative to said elongated flat portion with said tip portion having a narrowed end, and a spot of material located on each of said tip portions that fluoresces in the presence of blacklight,
said spots of said plurality of transparent members being of different sizes respectively,
each of said transparent members having a connecting end opposite its said one end, and
means for coupling said connecting ends of said plurality of transparent members together to allow said transparent members to move relative to each other,
a flat transparent member having a series of spaced apart lines of different lengths with dimension numbers formed next to said lines respectively,
said flat transparent member having an end coupled to said connecting means for movement relative to said plurality of transparent members.

12. The penetrant of comparator of claim 11, wherein:
said material of said spots and said material of said lines and dimension numbers fluoresce different colors in the presence of blacklight.

13. The penetrant comparator of claim 11, comprising:

each of said flat portions of each of said transparent members has a different spot size dimension number formed thereon of material that fluoresce in the presence of blacklight, the size of said spot of material on each of said transparent members is substantially equal to the dimension represented by its said spot size dimension number, the lengths of said lines on said flat transparent member are substantially equal to the dimensions represented by said dimension numbers of said flat transparent member respectively.

14. The penetrant comparator of claim 13, wherein:

said spots of material fluoresce in a color in the presence of blacklight that is different than the color in which said dimension numbers and said lines of said flat transparent member fluoresce in the presence of blacklight.

* * * * *